(12) United States Patent
Bojan et al.

(10) Patent No.: US 11,682,143 B2
(45) Date of Patent: Jun. 20, 2023

(54) SYSTEM AND METHOD FOR HAIR ANALYSIS OF USER

(71) Applicant: Revieve Oy, Helsinki (FI)

(72) Inventors: Thiyagarajan Manihatty Bojan, Espoo (FI); Joonas Hamunen, Helsinki (FI); Samuli Siivinen, Valencia (ES)

(73) Assignee: Revieve Oy, Helsinki (FI)

(*) Notice: Subject to any disclaimer, the term of this patent is extended or adjusted under 35 U.S.C. 154(b) by 275 days.

(21) Appl. No.: 17/241,646

(22) Filed: Apr. 27, 2021

(65) Prior Publication Data

US 2022/0366607 A1 Nov. 17, 2022

(51) Int. Cl.
*G06T 7/90* (2017.01)
*G06T 7/11* (2017.01)
*G06V 10/56* (2022.01)
*G06V 40/16* (2022.01)
*A45D 44/00* (2006.01)
*G06T 11/00* (2006.01)

(52) U.S. Cl.
CPC .............. *G06T 7/90* (2017.01); *A45D 44/005* (2013.01); *G06T 7/11* (2017.01); *G06T 11/001* (2013.01); *G06V 10/56* (2022.01); *G06V 40/171* (2022.01); *G06T 2207/10024* (2013.01); *G06T 2207/30196* (2013.01)

(58) Field of Classification Search
CPC . G06T 7/11; G06T 7/90; G06T 11/001; G06T 2207/10024; G06T 2207/30196; G06V 10/56; G06V 40/171; A45D 44/005
USPC ........................................................ 382/164
See application file for complete search history.

(56) References Cited

U.S. PATENT DOCUMENTS 11,172,873 B2 * 11/2021 Purwar ................ G06N 3/045
2004/0239689 A1 * 12/2004 Fertig ..................... G01J 3/526
345/419

(Continued)

FOREIGN PATENT DOCUMENTS

EP 3342331 B1 * 2/2020 ........... A61B 5/0077

OTHER PUBLICATIONS

Borza et al., "A Deep Learning Approach to Hair Segmentation and Color Extraction from Facial Images" SAT 2015 18th International Conference, Sep. 24-27, 2015, ISBN 978-3-540-74549-5, https://doi.org/10.1007/978-3-030-01449-0_37, 12 pages.

(Continued)

*Primary Examiner* — Gabriel I Garcia
(74) *Attorney, Agent, or Firm* — Ziegler IP Law Group

(57) ABSTRACT

A method for hair analysis of a user. The method segmenting a hair region in an image of the user to obtain a segmented hair region image; identifying one or more dominant hair colour types in; determining RGB values of pixels of the one or more dominant hair colour types; implementing a hair colour dictionary with multiple tints of plurality of hair colours classified as different hair colour names, with each of the classified different hair colour names having a relative RGB value; comparing the determined RGB values of the pixels of the one or more dominant hair colour types and the relative RGB values for the classified different hair colour types to identify the relative RGB value with a minimum distance; and determining the hair colour name corresponding to the identified relative RGB value with the minimum distance.

20 Claims, 6 Drawing Sheets

(56) References Cited

U.S. PATENT DOCUMENTS

| | | | | |
|---|---|---|---|---|
| 2014/0362379 A1* | 12/2014 | Spearing | ............... | G01J 3/463 |
| | | | | 356/402 |
| 2016/0154993 A1* | 6/2016 | Aarabi | ............... | H04N 1/628 |
| | | | | 382/118 |
| 2022/0335614 A1* | 10/2022 | Punyani | ............... | G06N 20/00 |

OTHER PUBLICATIONS

Extended European Search Report, European Patent Office, Application No. 22157986.5, dated Jul. 28, 2022, 8 pages.

Lucchese et al., "Color Image Segmentation: A State-of-the-Art Survey", Proceedings of the Indian National Science Academy. Part A. Physical Sciences, Indian National Science Academy, vol. 67, No. 2 Mar. 1, 2001, ISSN 0370-0046, XP-002244932, 15 pages.

Tan et al. "MichiGAN: Multi-Input-Conditioned Hair Image Generation for Portrait Editing", ACM Transactions on Graphics, vol. 39, No. 4, Jul. 8, 2020, ISSN: 0730-0301, DOI: 10.1145/3386569.3392488, 13 pages.

* cited by examiner

SYSTEM AND METHOD FOR HAIR ANALYSIS OF USER

TECHNICAL FIELD

The present disclosure relates generally to image processing techniques employing computer vision and deep learning neural networks, and more specifically, to a system and a method for a hair analysis of a user for providing hair products and style transformation recommendations.

BACKGROUND

Various types of hair analysis tools are known in the beauty industry. Typically, the hair analysis tools are used to determine texture and colour of the hair. The results so obtained may then be used to suggest hair care products for improving the look and feel of the hair. For example, depending upon the determined colour of the hair, a hair colour product may be recommended to the customer which may suit his/her profile. Thus, the hair analysis tools act as an aid in recommendation and sale of hair products. Conventionally, the colour of the hair is determined by placing a shade card next to the hair, and determining a shade from the shade card which closely matches the hair of the user. However, this method of determining the hair colour is tedious as it requires the shade card to be handy and may give inaccurate results depending on the perspective of the person making the match.

Some computer-based tools have been developed which utilizes user images for hair analysis, including, but not limited to, for effective determination of the hair colour. It may be appreciated that the colour is a component of light which is separated when it is reflected off of an object. Determining the hair colour in images is majorly influenced by the lighting conditions in the photographed scene. For instance, an image with indoor lighting may represent hair colour differently than that of an image with outdoor lighting. In another instance, a dark-brown hair may possibly be discerned as black hair by existing computer-based tools if the lighting condition is dark or the image may have a lot of shadows therein. Furthermore, the end customer may have a mix of hair colours which further makes it difficult for existing tools to provide accurate determination of different hair related criteria and make correct conclusions.

Therefore, in light of the foregoing discussion, there exists a need to overcome the aforementioned drawbacks associated with known tools for hair analysis of a user.

SUMMARY

The present disclosure seeks to provide a system and a method for hair analysis of a user. An aim of the present disclosure is to provide a solution that overcomes at least partially the problems encountered in prior art.

In an aspect, the present disclosure provides, the method for hair analysis of a user, the method comprising: segmenting a hair region in an image of the user to obtain a segmented hair region image; identifying one or more dominant hair colour types in the segmented hair region image; determining RGB values of pixels of the one or more dominant hair colour types in the segmented hair region image; implementing a hair colour dictionary with multiple tints of plurality of hair colours classified as different hair colour names based on corresponding HEX codes, with each of the classified different hair colour names having a relative RGB value based on the corresponding HEX codes; comparing the determined RGB values of the pixels of the one or more dominant hair colour types in the segmented hair region image and the relative RGB values for the classified different hair colour types to identify the relative RGB value with a minimum distance from the RGB values of the pixels of the one or more dominant hair colour types; and determining the hair colour name, from the different hair colour names in the hair colour dictionary, corresponding to the identified relative RGB value with the minimum distance.

In second aspect, the present disclosure provides, a system for hair analysis of a user, the system comprising a segmentation block configured to segment a hair region in an image of the user to obtain a segmented hair region image; and a colour detection block configured to: identify one or more dominant hair colour types in the segmented hair region image; determine RGB values of pixels of the one or more dominant hair colour types in the segmented hair region image; implement a hair colour dictionary with multiple tints of plurality of hair colours classified as different hair colour names based on corresponding HEX codes, with each of the classified different hair colour names having a relative RGB value based on the corresponding HEX codes; compare the determined RGB values of the pixels of the one or more dominant hair colour types in the segmented hair region image and the relative RGB values for the classified different hair colour types to identify the relative RGB value with a minimum distance from the RGB values of the pixels of the one or more dominant hair colour types; and determine the hair colour name, from the different hair colour names in the hair colour dictionary, corresponding to the identified relative RGB value with the minimum distance.

Embodiments of the present disclosure substantially eliminate or at least partially address the aforementioned problems in the prior art, and enable truthful hair analysis of the user. In particular, embodiments of the present disclosure consider multiple criteria, including a hair texture, a hair volume, a hair luster and a hair frizziness, for comprehensive hair analysis of the user. Furthermore, embodiments of the present disclosure provide a hair colour name and make recommendations for suitable hair products, including hair colour based on the hair analysis. Moreover, the embodiments of the present disclosure help to generate one or more style transformations for the user based on the hair analysis.

Additional aspects, advantages, features and objects of the present disclosure would be made apparent from the drawings and the detailed description of the illustrative implementations construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1:
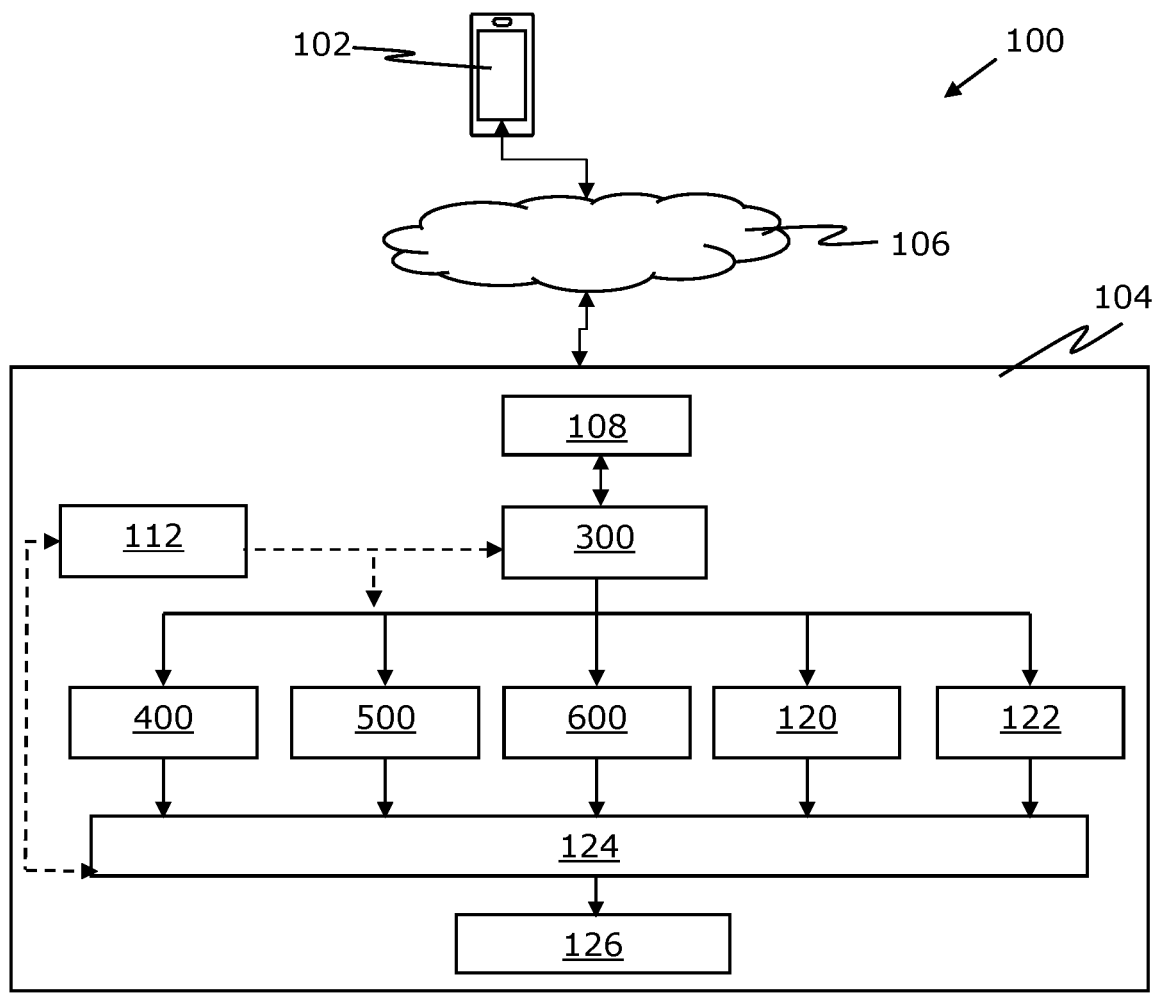
FIG. 1 a schematic illustration of a system for a hair analysis of a user, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, the present disclosure provides, the method for hair analysis of a user, the method comprising: segmenting a hair region in an image of the user to obtain a segmented hair region image; identifying one or more dominant hair colour types in the segmented hair region image; determining RGB values of pixels of the one or more dominant hair colour types in the segmented hair region image; implementing a hair colour dictionary with multiple tints of plurality of hair colours classified as different hair colour names based on corresponding HEX codes, with each of the classified different hair colour names having a relative RGB value based on the corresponding HEX codes; comparing the determined RGB values of the pixels of the one or more dominant hair colour types in the segmented hair region image and the relative RGB values for the classified different hair colour types to identify the relative RGB value with a minimum distance from the RGB values of the pixels of the one or more dominant hair colour types; and determining the hair colour name, from the different hair colour names in the hair colour dictionary, corresponding to the identified relative RGB value with the minimum distance.

In a second aspect, the present disclosure provides, a system for hair analysis of a user, the system comprising a segmentation block configured to segment a hair region in an image of the user to obtain a segmented hair region image; and a colour detection block configured to: identify one or more dominant hair colour types in the segmented hair region image; determine RGB values of pixels of the one or more dominant hair colour types in the segmented hair region image; implement a hair colour dictionary with multiple tints of plurality of hair colours classified as different hair colour names based on corresponding HEX codes, with each of the classified different hair colour names having a relative RGB value based on the corresponding HEX codes; compare the determined RGB values of the pixels of the one or more dominant hair colour types in the segmented hair region image and the relative RGB values for the classified different hair colour types to identify the relative RGB value with a minimum distance from the RGB values of the pixels of the one or more dominant hair colour types; and determine the hair colour name, from the different hair colour names in the hair colour dictionary, corresponding to the identified relative RGB value with the minimum distance.

For explanatory purposes, the term "user" broadly encompasses anyone whose hair needs to be analysed, including an individual, a customer, a consumer, or any other entity. Any reference to "hair" herein may not necessarily refer to a single strand of hair of the user, but may encompass a partial or complete set of hairs of the user. As may be contemplated, the colour of human hair varies from user to user. Further, the quality of the hair analysis depends on various criteria, such as, but not limited to, hair texture, hair volume, hair luster (i.e. shininess), hair frizziness. The method and the system of the present disclosure aim to solve the problem of how to provide accurate hair analysis considering the various criteria as discussed above. The present method for hair analysis of the user is implemented in the system as described herein, which may be in the form of a computing device, as discussed hereinafter in more detail. The system for hair analysis of a user comprises a computing device and an image resource connected over a data communication network to the computing device, wherein the computing device is configured to receive an image of the user in the computing device and the computing device comprises one or more image processing and analysis blocks for performing the hair analysis of the user. The computing device can be e.g. a server, computer, smartphone, etc. The image can be received in the computing device from the image resource by transferring from a camera, downloading from a website, uploaded from another device or captured by a camera of the computing device.

In an embodiment, the system may comprise a smart phone as a user device connected over data communication network to a computing device configured to receive one or more images from the user device, wherein the computing device comprises a segmentation block, a helper block, a colour detection block, a hair texture block, a hair volume block, a hair luster block, a hair frizziness block, a hair analysis block and an analysis result block. The segmentation block is configured to receive images from the image block and perform image segmentation to provide a segmented hair region image. The helper block is configured to support the segmentation block, the helper block, the colour detection block, the hair texture block, the hair volume block, the hair luster block, the hair frizziness block, the hair analysis block by providing each block corresponding algorithms, data sets and calculation scores. The colour detection block enables to determine the hair colour type. The hair texture block determines a hair texture from the segmented hair region image using a hair texture trained function. The hair volume block determines a hair volume from the segmented hair region image using a hair volume trained function. The hair luster block determines a hair luster from the segmented hair region image using a hair luster trained function. The hair frizziness block determines a hair frizziness from the segmented hair region image using a hair frizziness trained function. The hair analysis block receives data from the helper block, the colour detection block, the hair texture block, the hair volume block, the hair luster block, the hair frizziness block. The analysis result block outputs the hair colour name based on the corresponding HEX codes for the determined relative RGB value of the determined hair colour.

The method for hair analysis of a user comprises segmenting a hair region in an image of the user to obtain a segmented hair region image. Herein, the "image" refers to an image of the user which may properly depict the hair of the user; i.e. a sufficient portion of the hair of the user may be clearly visible in a given perspective of the image. In an example, the said image may be an image of the frontal face of the user with the hairs visible therein. In another example, the said image may be an image of top portion of the user, focusing primarily on the hair of the user. In still another example, the said image may be a composite image formed by combining multiple images from different angles of the face of the user, with sufficient portion of the hair of the user being clearly visible.

Herein, the system, in the form of the computing device, may be configured to receive the said image of the user. In particular, the computing device may be, but not limited to, a server, a desktop computer, a smartphone, and the like. The image may be received in the computing device by transferring from a camera used for capturing the image. It may be appreciated that in some examples, such as the smartphone, the camera may be integrated in the computing device and thus there may not be need to transfer the image thereto. In some examples, the image may also be downloaded to the computing device, for instance from a website or a messaging application.

In one or more embodiments, when the image of the user is received in the system, the system may request additional information from the user. The request for additional information may be in the form of fields, checkboxes or options to provide details related to one or more of lighting information, contrast information and posture information of the image. Herein, the request for lighting information may seek information about whether the image was captured in a daylight or in a fluorescent or in a halogen. Herein, the request for contrast information may seek to get confirmation if there is contrast variation between foreground person and the background scene. Herein, the request for posture information may seek to get confirmation whether the image is in a portrait image or other type. It may be appreciated by a person skulled in the art that that the algorithm(s) implemented by the present method may tune itself based on the received additional information; that is, the algorithm(s) may work differently if there is a confirmation that the image is taken in daylight as compared to the confirmation for the image being taken in fluorescent light.

The system comprises a segmentation block configured to segment a hair region in an image of the user to obtain a segmented hair region image. The system further comprises a helper block configured to receive the image with the masked hair region from the segmentation block and may provide the segmented hair region image on black background. That is, once the image is obtained, the hair region in the image may be segmented by the segmentation block.

It may be contemplated that in computer vision, when only a certain region of a given image is selected then it is referred to as a segment of the given image. In order to segment the hair regions in the image of the user, the segmentation block may employ a machine learning model to extract the hair region in the image and obtain the segmented hair region image. Herein, the machine learning model may implement deep learning neural networks such as, a convolutional neural network (CNN). During the segmentation, background and other non-relevant information in the image may be ignored. The segmented hair region image may depict only the hair region of the image. All other features of the image and the background may be concealed. That is, the segmented hair region image may show only the hair region on a white background.

It may be understood that the machine learning is a subset of artificial intelligence. Herein, the machine learning model is trained in order to perform certain activities without having to program it again and again. Typically, the machine learning model comprises a single layered or a multi layered artificial neural network (ANN) with the output of each layer serving as the input to the succeeding layer. A set of predefined data sets containing a set of input data sets with their respective output data set is provided. According to the set of predefined data the machine learning model is trained by employing some learning algorithms such as a supervised learning algorithm, an unsupervised algorithm or a reinforcement algorithm. A supervised learning is like a teacher-student based learning. Herein, the input data set and their respective output data set are provided. The machine learning model considers them as examples and learns a rule to map the input data set with the respective output data set. In an unsupervised algorithm, the output data set is not provided and the machine learning model learns without supervision. In reinforcement learning no data set is provided and the machine learning model learns with experience.

In the present implementation, the machine learning model may be provided with an input data set consisting of a set of images of multiple users. The hair region of the images of the input data set may be segmented and the obtained segmented hair region image may be provided as the output data set. The machine learning model may be trained according to the input and the output data set in order to learn a rule that maps each image of the input data set to the respective segmented hair region image of the output data set. Once, the machine learning model is trained, the trained machine learning model may be implemented to obtain the segmented hair region image from the image of the user.

Optionally, segmenting the hair region in the image comprises identifying postures in the image, masking the hair region in the image based on the identified postures, down-sampling the image with the masked hair region, extracting a plurality of hair region pixel from the down-sampled image, and defining pixel locations of at least one of the extracted pluralities of hair region pixel. Herein, in particular, the segmentation block of the system is further configured to identify postures in the image, mask the hair region in the image based on the identified postures, down-sample the image with the masked hair region, extract a plurality of hair region pixel from the down-sampled image and define pixel locations of at least one of the extracted pluralities of hair region pixel.

In an embodiment the segmentation block configured to receive an image comprises a convolutional neural network (CNN) for processing the received image to generate a segmented mask. The segmentation block is further configured to process the segmented mask into a masked image, and then to a masked-out image and finally to a segmented hair region image. In particular, the image is taken as an input by the segmentation block. The convolutional neural network (CNN) processes the image in order to obtain the segmented mask. Herein, all other features such as face and background may be masked. However, some portions of skin may be still present. The segmented mask is processed further to obtain the masked image. The masked image identifies the pixels of the hair in order to define a hair region. The masked image may be processed to obtain the masked-out image. Herein, the hairs of the hair region may be clearer and few strands of the hairs of the hair region may be visible. The masked-out image is processed to finally obtain the segmented hair region image. The segmented hair region image provides a well-defined outline of the hair region with the strands of the hair being clearly visible.

That is, in order to effectively segment the hair region, first the postures in the image may be identified. As discussed, the image showing a face of the user along with the hair region may be considered good for the hair analysis. Other images with only partial (e.g., cropped) view of face and/or hair region may give inaccurate hair analysis. Herein, while segmenting the hair region, the postures in the image may be identified in order to make sure that the postures in the image may have similar postures to the postures of the set of images of the input data set in the machine learning model. If the posture differs then the accuracy might not be optimal. For example, when the user takes a selfie and the camera's Field of-View (FoV) is restricted around the chest region with clear view of the face and the hair region, such image may be considered to have a "good" posture, as the machine learning model is also generally inputted with similar images. In contrast, if the image captured is a full picture of the user with limited details of the face and the hair region, such image may be considered to have "not good" posture, which ultimately may reduce the accuracy of the hair analysis. In some examples, when the posture of the image is identified to be "not good", a notification may be sent to the user to recapture the image or use a different image for the purpose of hair analysis. Further, the user may be guided to capture the image with proper posture by providing directional arrows on a screen of the smartphone (for example) for moving the associated camera such that the image with proper posture as may be required for processing for hair analysis could be obtained.

Once the posture of the image has been identified, the hair region of the image may be masked based on the identified postures. Herein, the background and unnecessary features of the image may be blackened and only the hair region may be made florescent or white in order to highlight the hair region of the image. As discussed, the machine learning model may be implemented to output the image with the masked hair region image. It may be appreciated that once the data set comprising the set of input images and their respective masked image as the output image are fed, the machine learning model may implement the image's training, Dev and Test datasets which may be split accordingly and passed to Deep Learning Framework such as, but not limited to, Tensorflow2 for the present purpose. The details of implementation of the machine learning model may be contemplated by a person skilled in the art and thus has not been explained in detail herein for the brevity of the present disclosure. The image with the masked hair region may only have the hair region.

The image with the masked hair region may be then down-sampled. Down-sampling the image refers to reducing the size of the image. The down-sampling of the image with the masked hair region may be done in order to get rid of pixels other than the hair region. That is all other irrelevant regions of the image expect for the masked hair region may be removed. Further, as may be appreciated by a person skilled in the art that the down-sampled may be faster to process as compared to the original masked image. As understood, the image is made of pixels, with each pixel representing one colour at that particular location, such as X-Y coordinate in the image. The down-sampled image may be processed in order to extract the plurality of hair region pixels. Further, the pixel locations of at least one of the extracted pluralities of the hair region pixel may be defined.

According to the embodiments, several algorithms and architectures may be employed for segmenting the hair region of the image. In one implementation, the system is configured to implement a Fully Convolutional Network (FCN) by the segmentation block for determining the segmented hair region image. Herein, the images may be down-sampled to smaller size while gaining more channels through a series of convolutions referred as "encoders". The encoded outputs may be then up-sampled through a series of transpose-convolution or bilinear interpolation. This process is performed by a "decoder". In some examples, an advance version of the of the FCN, known as "U-net" may be employed for segmenting the hair region of the image. The U-net is advantageous as the U-net architecture has skip connections from output of the convolution block to the corresponding input of the transposed-convolution block at the same level. It may be contemplated that, other segmentation architecture like Tiramisu (Densenet), Pyramid Scene Parsing Network, Atrous Convolution and the likes may be also employed for segmenting the hair region of the image. Furthermore, some hyper parameter tunings may be performed in order to improve the result.

In particular, the FCN may extract the plurality of hair region pixel for the image and may define the pixel locations of at least one of the pluralities of hair. As discussed, in an embodiment, the image with the masked hair region may show the hair region by white colour and the rest of the region may be blackened. The image with the masked hair region may be referred as the masked image and may be processed in order to obtain a masked-out image. Herein, the original hair colour of the user in the image may be shown on the hair region and the rest of the image may be blackened out. Next the rest of the region in the image with the masked hair region apart from the hair region may be whitened in order to obtain the segmented hair region image. At this stage, the strands of the hair along with its hair region and its outline may be clearly visible. In this way the hair region may be extracted and the pixel locations may be defined.

The method for hair analysis further comprises identifying one or more dominant hair colour types in the segmented hair region image. In particular, once the segmented hair region image is obtained by the segmentation block, the segmentation block may send the segmented hair region image to a colour detection block for determining the hair colour name. It may be contemplated that, typically the hair region of the user may have a number of colours. For instance, the user may have some black hairs, some white hairs, some brown hairs, some red hairs and some grey hairs. However, number of the white hairs may be few as compared to the other colours, and thus could be neglected. Herein, the colours that are significant in number in the hair region of the segmented hair region image may be identified as the "dominant hair colour types" as per the embodiments of the present disclosure.

Optionally, identifying the one or more dominant hair colour types comprises determining a hair colour distribution with a number of clusters of colours in the segmented hair region image using the clustering technique, selecting a predefined number of clusters of colours from the determined number of clusters of colours in the hair colour distribution, determining a set of centroids for the selected predefined number of clusters, determining a pixel population count for the set of centroids by using a histogram and determining the dominant hair colour types based on the determined pixel population count. That is, the colour detection block of the system is further configured to determine a hair colour distribution with a number of clusters of colours in the segmented hair region image using the clustering technique, select a predefined number of clusters of colours from the determined number of clusters of colours in the hair colour distribution, determine a set of centroids for the selected predefined number of clusters, determine a pixel population count for the set of centroids, using a histogram and determine the dominant hair colour types based on the determined pixel population count.

As discussed, the hair region may not have one specific colour. Rather, the hair region may include a number of clusters of colours. In order to identify the one or more dominant hair colour type, the hair colour types may be categorised in a standard form. For the purposes of the present disclosure, the hair colour types may be classified into five clusters of hue colours, namely grey, black, brown, reddish and blond. However, for any given segmented hair region image, a percentage of one or more clusters may be obtained. That is, the hair region may have multiple combinations of the hair colour types such as, but not limited to, blackish grey and blondish brown.

Thereafter, a number of algorithms may be employed for identifying the clusters of colours in the segmented hair region image. Herein, an unsupervised learning approach for determining hair colour may be used. In an embodiment, a K-means clustering algorithm may be employed. The K-means clustering algorithm is a type of machine learning that may be used for grouping data points of a data set. Herein, the data points having similar characteristics are placed in one group. The groups are non-overlapping and are referred to as the clusters. The clustering algorithm may be used to group pixels of the segmented hair region image. In the present implementation, the pixels in the segmented hair region image may be grouped into five clusters of hue colours by using the K-means clustering algorithm, with "k" being equal to 5 and the clusters of colours including grey, black, brown, reddish and blond. The hair colour distribution may be formed for user reference, for example in the form of a pie-chart, that depicts the percentage of each cluster of colours in the segmented region hair image. By default, the "k" value may be set to 5 to determine the top five dominant hair colours types in the image; however, if the segmented hair region image may have generally uniform hair colour types, then the algorithm may consider the valley of "k" as less than five without any limitations. In particular, herein, the number of clusters are defined and the shape of the RGB channels are restructured in the image as a vector, which are passed to the algorithm as input.

Once, the hair colour distribution is obtained, the predefined number of clusters of colours from the determined number of clusters of colours in the hair colour distribution may be selected. Herein, the colours that have significantly low percentage may be skipped (e.g., below a certain predefined threshold), and only the colours that have significant high percentage (e.g., above the said certain predefined threshold) may be selected from the hair colour distribution. Further, the number of colours to be selected may be predefined. For example, in an embodiment, the predefined number of clusters of colours may set as three. Herein, the top three colours in terms of percentage may be selected from the hair colour distribution, and rest all of the cluster of colours (as determined) may be ignored.

Once, the predefined number of clusters are selected, the set of centroids for the predefined number of clusters may be determined. The centroid for clustering algorithm is the data point at the centre of each cluster. Herein, centroid for each cluster may be a pixel at a centre of the given cluster. Further, the pixel population count for the set of centroids may be calculated by using a histogram. As may be understood, in traditional k-means, the new centroid value is computed as the mean of the pixel values of all the pixels that belong to a particular cluster. Finally, the one or more dominant hair colour types based on the determined pixel population count may be determined. The one or more dominant hair colour types may be the ones having greater pixel population count. By histogram analysis, the mode of the distribution of the pixel values of a cluster is calculated instead of the mean. The new centroid is taken as the pixel value that is repeated the highest number of times in the cluster. The basis of histogram analysis stems from the fact that the mode is a more robust representative of the cluster than the mean and so a single very unrepresentative pixel in a cluster will not affect the mode value, which will affect the mean value significantly. Since the mode value must actually be the value of the pixel occurring the maximum number of times in the cluster, the histogram analysis does not create new unrealistic pixel values when there is wide variation in pixel values. Therefore, the dominant hair colour types may be determined based on the determined pixel population count.

Optionally, the method, when determining the pixel population count, further comprises discarding the pixel population count corresponding to white colour while determining the dominant hair colour types. That is, the colour detection block of the system is further configured to discard the pixel population count corresponding to white colour while determining the dominant hair colour types. It may be understood that for the segmented hair region image majority of pixel population may be pure white having RGB values as 255, 255 and 255. This is so, because apart from the hair region, the segmented hair region image is pure white due to white background thereof. Since, the hair colour type needs to be determined, the pure white pixels are required to be discarded; otherwise, the hair colour type may mistakenly be determined as white due to the large pixel count of white colour.

The method further comprises determining RGB values of pixels of the one or more dominant hair colour types in the segmented hair region image. That is, once the one or more dominant hair colour types have been determined, the RGB values of pixels in each of the dominant colour types may be determined. Herein, the RGB values provide an intensity of red, green and blue components of the pixels in the segmented hair region image. As may be understood, the combination of the red, green and blue values contributes to the resultant colour perceived by an observer.

The method further comprises implementing a hair colour dictionary with multiple tints of plurality of hair colours classified as different hair colour names based on corresponding HEX codes, with each of the classified different hair colour names having a relative RGB value based on the corresponding HEX codes. As discussed, the one or more dominant hair colour types in the segmented hair region image may be more than one. For example, in an embodiment the hair of the user may be perceived as a dark brown colour. However, the algorithm employed to determine the hair colour name may perceive that the hair region consists of brown pixels, black pixels, light brown pixels representing small skin areas and white pixels. Furthermore, the segmented hair image may have various tints of brown. For example, there may be different tints for brown colour with different HEX codes, which all may still be brown colours but each of those may have different RGB values and different HEX codes. Typically, only some of the colours have hair colour names already defined. Hence, in order for the method of hair analysis of the present disclosure to provide the correct hair colour name, that is not limited to just RGB value or HEX code values but also the name of the colour, the hair colour dictionary needs to be implemented. The hair colour dictionary may be in the form of a lookup table in which the HEX code and the relative RGB values based on the corresponding HEX code may be mapped to the respective hair colour name. Herein, the relative RGB value for each HEX code may be the value of intensity of red, blue and green components of the hair colour name defined by the respective HEX code. For example, a subset of the brown colour in the hair colour dictionary may map the hex codes #53311B, #A38085, #816457, #5F3420, #6E4C2D, #B57452 and #C0A69 to golden-brown, golden-honey-brown, caramel brown, toffee-brown, neutral-brown, and ash-brown respectively. It may be appreciated that a large number of hex codes and their relevant hair colour names may be added in the hair colour dictionary for precise hair colour naming options.

The method further comprises comparing the determined RGB values of the pixels of the one or more dominant hair colour types in the segmented hair region image and the relative RGB values for the classified different hair colour types to identify the relative RGB value with a minimum distance from the RGB values of the pixels of the one or more dominant hair colour types. That is, in order to deduce the relative RGB value that matches closest to the determined RGB values of the pixels of the one or more dominant hair colour types comparison may be performed. Herein, the comparison results may be processed to identify the relative RGB value with the minimum distance from the RGB values of the pixels of the one or more dominant hair colour types. Such a comparison technique using computing devices is well known in the art and thus now described herein.

Optionally, determining the relative RGB value with the minimum distance further comprises determining absolute differences in each of the R, G and B channels between the determined RGB values of the pixels of the one or more dominant hair colour types in the segmented hair region image and the relative RGB values for the classified different hair colour types; and normalizing the determined absolute differences in each of the R, G and B channels. That is, the colour detection block is further configured to determine absolute differences in each of the R, G and B channels between the determined RGB values of the pixels of the one or more dominant hair colour types in the segmented hair region image and the relative RGB values for the classified different hair colour types and normalize the determined absolute differences in each of the R, G and B channels to determine the relative RGB value with the minimum distance.

As discussed, in order to identify the relative RGB value with the minimum distance, the determined RGB values may be compared. In particular, in the present implementation, the RGB values of the pixels of each of the one or more dominant hair colour types may be subtracted from the relative RGB values of each of the classified different hair colour types in order to determine the absolute difference. For example, if one of the dominant hair colour types is brown, then RGB value of the brown colour is determined. Herein, as discussed, the RGB value is the intensity of each of R, G, and B channels. Next, each of the R, G and B channels of the determined RGB value may now be subtracted from respective R, G and B channels of each of the classified different hair colour types so as to obtain the absolute difference. This way the absolute difference for each of the one or more dominant hair colour types may be identified.

Once, the one or more dominant hair colour types have been identified, the determined absolute differences in each of the R, G, and B channels may be normalized. As may be contemplated, normalization is a process of scaling the values of the variables between a certain range. Generally, the range may be taken as 0 to 1. There are a number of ways to perform the normalization. Typically, the normalization is done by a formula $$X_{new} = \frac{X - X_{min}}{X_{max} - X_{min}}$$

wherein, 'X' is the original value of the variable, '$X_{new}$' is the new value of the variable 'X' obtained after normalization, '$X_{min}$' is the minimum value of the variable 'X' and '$X_{max}$' is the maximum value of the variable 'X'. It may be understood that, the absolute difference without normalization may be random and may not make any sense because of the values of the absolute differences may not be restricted to any particular range. For example, one of the absolute values for the R, G and B channels may be 10, 15, 20 and another absolute value for the R, G and B channels may be 70, 90, 50. The two absolute values would not make any sense as they do not lie in any particular range. Hence, normalization may be employed in order to ensure that all the absolute values for the R, G and B channels lie in a defined range. In an embodiment, all the absolute values for the R, G and B channels may be normalized such that they lie in a range of 0 to 1.

Further, herein, identifying the relative RGB value with the minimum distance from the RGB values of the pixels of the one or more dominant hair colour types may include comparing all of the absolute differences in order to find the one which is the lowest, and the relative RGB value for which the absolute difference is minimum may be considered. It may be understood that the relative RGB value for which the absolute difference is minimum may be the closest match to the RGB values of the pixels of the one or more dominant hair colour types, and hence the respective relative RGB value may be identified.

The method further comprises determining the hair colour name, from the different hair colour names in the hair colour dictionary, corresponding to the identified relative RGB value with the minimum distance. As discussed, the identified relative RGB value may be the closest match to the dominant hair colour types. The identified relative RGB values may be converted to HEX code, which may then be searched for in the defined hair colour dictionary. As each of the hair colour names in the hair colour dictionary may have a particular HEX code, the HEX code (as obtained from conversion) may be matched in the hair colour dictionary in order to obtain the hair colour name corresponding thereto. The hair colour name may be then outputted on the computing device used for the hair analysis for reference of the user.

Optionally, the method further comprises determining a hair texture from the segmented hair region image using a hair texture trained function. The system includes a hair texture block configured to determine a hair texture from the segmented hair region image using a hair texture trained function. In an exemplary implementation, the hair texture may be classified as one of straight, wavy, curly and coily. The hair texture trained function may take the segmented hair region image as the input and may determine the percentage of hair that are straight, the percentage of hair that are wavy, the percentage of hair that are curly and the percentage of hair that are coily. The classification of the hair texture which has the highest percentage may be considered as the hair texture of the user. For instance, in an example, the percentage of straight hairs may be 10, the percentage of wavy hairs may be 15, the percentage of curly hairs may be 60 and the percentage of coily hairs may be 15. In such an example, the hair texture trained function may determine the hair texture as curly. Herein, the hair texture trained function may be a machine learning model comprising convolutional neural network (CNN) trained to determine the hair texture of the segmented hair region image. The hair luster trained function may be pre-trained based on a set of input images with varying hair texture and preassigned classification of hair volume thereto. Such machine learning model may be contemplated by a person skilled in the art and thus has not been explained herein.

Optionally, the method further comprises determining a hair volume from the segmented hair region image using a hair volume trained function. The system includes a hair volume block configured to determine a hair volume from the segmented hair region image using a hair volume trained function. Herein, the hair volume trained function may be a machine learning model comprising CNN that may be trained to determine the hair volume of the segmented hair region image. Hair volume may be categorized as low, average, good and dense. The hair volume trained function may take the segmented hair region image as the input and may find the percentage of volume of the hair region. If the percentage is greater than a threshold for the average hair volume but lesser than a threshold for good hair volume, then the hair volume may be determined as average. Similarly, if the percentage is greater than the threshold for the good hair volume and lesser than the threshold for the dense hair volume, then the hair volume may be determined as good. If the percentage is greater than the threshold for the dense hair volume, then the hair volume may be determined as dense. In an exemplary embodiment, the threshold for low hair volume may be 10 percent, the threshold for average hair volume may be 50 percent, the threshold for good hair volume may be 70 percent and the threshold for dense hair volume may be 90 percent. Hence, if the percentage of volume of the hair region in the segmented hair region image is 78%, then the hair volume trained function may determine the hair volume as "good".

In an embodiment, the hair volume trained function may utilize the following formula for determining the hair volume from the segmented hair region image:

$$\text{volume} = \frac{L \times S}{R} \times 100$$

where, 'L' is defined as the length of the nonzero pixel locations in the segmented hair region image, 'S' is a scale factor which, typically, may be a constant with a value of 2, and 'R' is defined as a total resolution of the image of the user. Next, an algorithm may be trained to output hair volume as "low" when the hair volume is calculated to be less than 15, "average" when the hair volume is calculated to be greater than or equal to 15 and less than 25, "good" when the hair volume is calculated to be greater than 25 and less than 60, and "dense" when the hair volume is calculated to be greater than or equal to 60. It may be contemplated that the hair volume may also depend on gender, and hence the defined limits may vary according to gender.

Optionally, the method further comprises determining a hair luster from the segmented hair region image using a hair luster trained function. The system includes a hair luster block configured to determine a hair luster from the segmented hair region image using a hair luster trained function. Furthermore, the hair luster block may obtain a luster score from the helper block, in the system, based on verification check performed by the helper block. As may be understood, hair luster signifies how shiny the hair is, and is generally a measure of a glow or shine in the hair. When the hair is shiny, then some pixels may appear different in the image, and thus the hair luster is taken into consideration for hair analysis of the user. In an exemplary embodiment, hair luster may be categorized as low, average and high. The hair luster trained function may be a machine learning model that may implement a deep learning algorithm to predict if the segmented hair region image has a glow or shine in it. The hair luster trained function may be pre-trained based on a set of input images with varying hair luster and preassigned category of hair luster thereto. Such machine learning model may be contemplated by a person skilled in the art and thus has not been explained herein.

Optionally, the method further comprises determining a hair frizziness from the segmented hair region image using a hair frizziness trained function. The system includes a hair frizziness block configured to determine a hair frizziness from the segmented hair region image using a hair frizziness trained function. Furthermore, the hair frizziness block may obtain a frizziness score from the helper block based on the verification check performed by the helper block. Hair frizziness refers to hair which is not smooth and may have individual shafts that are variably wavy and do not align together. The hair frizziness may be categorized into a low frizziness hair, an average frizziness hair and a high frizziness hair. The hair frizziness trained function may determine a frizziness score in order to find the hair frizziness. The hair frizziness trained function is a pre-trained machine learning model that implements the deep learning algorithm to predict if the segmented hair region image has the frizziness in the hair region or not. The hair frizziness trained function may be pre-trained based on a set of input images with varying hair frizziness and preassigned category of hair frizziness thereto. Such machine learning model may be contemplated by a person skilled in the art and thus has not been explained herein.

Optionally, the method further comprises receiving a user selection from the user and providing one or more first recommendations to the user based on the user selection and at least one of the hair colours, the hair texture, the hair volume, the hair luster and the hair frizziness. The user selection may be made by displaying a plurality of selectable graphical user interface (GUI) elements, for example, in the form of buttons or a drop-down menu on a display of the computing device. The user selection may be based on the purpose of performing the hair analysis by the user. For example, the user may be interested to know about a suitable hair colour product therefore. In a such case, the selection may be made by selecting a, for example, "Recommend hair colour product" button or the like. For instance, in case of a touch screen interface of the computing device, the user may click on the appropriate GUI element in order to make the user selection. On receiving the user selection, the method may make one or more first recommendation based on the user selection and at least one of the hair colours, the hair texture, the hair volume, the hair luster and the hair frizziness. For example, if the hair colour of the user is determined to be black, and it has been determined that a light brown colour may suit the user (by employing some suitable application as known in the art; in a such case, the first recommendation may be a hair colour product of light brown colour shade.

Optionally, providing the one or more first recommendations comprises recommending at least one of a new hair colour, a new hair style, a hair colour product and a hair care product. As discussed, according to the user selection one or more first recommendations may be provided. Further, as discussed, the user may wish to know a suitable hair colour that would suit him/her. Herein, the user may make selection by selecting the GUI meant for recommending a new hair colour. Once the user makes a user selection, the method may determine the new hair colour according to the hair analysis, and recommend the new hair colour which may suit the user in view of the determination of the current hair colour of the user. Similarly, it may be understood that the recommendations for the new hair style, the hair colour products and the hair care products may be made.

Optionally, the method further comprises generating one or more style transformation images by performing a synthetic style transformation based on at least one of the hair colours, the hair texture, the hair volume, the hair luster and the hair frizziness. Herein, the one or more style transformation images may be used to virtually show the user how the user may look when the user follows the one or more first recommendations. That is, herein a synthetic style transformation may be done on the image in order to generate the one or more style transformation images. For example, if the hair colour of the user is black and the method recommends the new hair colour as red, the method may make the hairs of the user in the image red and generate the style transformation image. The style transformation image may be then presented on the computing device of the user to give the user an idea as to how he/she may look when the hairs are turned red.

Optionally, the method further comprises providing one or more second recommendations to the user based on the one or more first recommendations and the one or more style transformation images. Depending on the one or more first recommendations and the one or more style transformation images, the one or more second recommendations is provided to the user. As discussed, the one or more first recommendations may be dying hair with the red colour or the brown colour. Herein, two style transformation images may be generated. A first style transformation image may show how the user may look when the hairs are coloured red. A second style transformation image may show how the user may look when the hairs are coloured brown. Depending on both the style transformation images the one or more second recommendations may be made to the user. If the first style transformation images look better then, the second recommendations may be red colour. If the second style transformation images look better then, the second recommendations may be brown colour. Furthermore, the second recommendations may also give an idea of what style the user may opt. For example, when the one or more first recommendations are dying the hairs red, three style transformation images may be generated that may depict how the user may look when the hairs are straight, curly and coily, respectively. The three style transformation images may be viewed and the style that suits best to the user may be recommended as the second recommendation. That is, if for the above example, straight hairs look good, the second recommendations may be straightening the hairs along with dying the hair with red colour.

The system comprises an analysis block configured to receive a user selection from the user and provide one or more first recommendations to the user based on the user selection and at least one of the hair colours, the hair texture, the hair volume, the hair luster and the hair frizziness, wherein the one or more first recommendations comprises recommending at least one of a new hair colour, a new hair style, a hair colour product and a hair care product; generate one or more style transformation images by performing a synthetic style transformation based on at least one of the hair colour, the hair texture, the hair volume, the hair luster and the hair frizziness and provide one or more second recommendations to the user based on the one or more first recommendations and the one or more style transformation images. The analysis block may provide one or more first recommendations to the user based on the user selection. For example, if the user selection is the new hair colour, the analysis block may recommend the hair colour to the user. The analysis block may also generate one or more style transformation images and provide one or more second recommendations.

In the present system, the helper block may enable to double verify the hair texture, a direction of the hair region, the direction of different parts of the hair region and the likes. The helper block may provide double check if there are some problems in the image, for example, if there is no hair in the image, or the image is blurry or covered by the hat and subsequently the system may notify the user to provide a new better image. The helper block may perform an alternative verification check to find colour variations in the hair between the dominant hair colour such as, black hair versus the shiny hair region that may be a horizontal white line in the image. Based on the verification check, the helper block may predict and provide the luster score to the hair luster block. The helper block may be configured to perform an alternative verification check to find contour of the hair and/or geometrical shape determination in order to determine non-uniform hair present in the image and based on this verification check, it may predict and provide the frizziness score to the hair frizziness block. The helper block may comprise refinement algorithm that may be hair extraction algorithms, hair colour dictionary comprising standard colour codes in HEX codes and corresponding colour names, datasets of hair texture and datasets of hair volume.

The system and the method for the hair analysis may be implemented in a number of applications. In an embodiment, the present system and method may be implemented as a mobile app for Android® or iOS®, where the deep learning algorithm may be executed both on cloud as well as locally. Herein, the user may open the mobile app and capture the image of the user by the mobile camera. Next, out of all the images stored in the mobile and/or captured by the mobile camera, the image for hair analysis may be selected. Next, the user may provide the user selection by providing the additional information requested by the app. The image may be then processed to obtain the hair analysis and/or the style transformation images. Finally, the one or more first recommendations and one or more second recommendations may be provided. It may be appreciated that the present system and method may be utilized as an independent software application to be used in any hair care retail industry.

The system, the method and the computer product are advantageous as the hair analysis of the user may be determined easily and effectively. Moreover, instead of just providing a single hair colour name, the present disclosure may also provide additional information such as hair colours distribution pattern with its colour variation percentage metric. Furthermore, the method may perform style transformation images in order to make one or more second recommendations to the user.

DETAILED DESCRIPTION OF THE DRAWINGS

Referring to FIG. 1, there is shown a schematic illustration of a system 100 for a hair analysis of a user, in accordance with an embodiment of the present disclosure. The system comprises a smart phone as user device 102 connected over data communication network 106 to a computing device 104, wherein the computing device configured to receive an image 108, a segmentation block 300, a helper block 112, a colour detection block 400, a hair texture block 500, a hair volume block 600, a hair luster block 120, a hair frizziness block 122, a hair analysis block 124 and an analysis result block 126.

The segmentation block 110 is configured to receive images 108 from a user device 102 and perform image segmentation to provide a segmented hair region image. The helper block 112 is configured to support the blocks 110, 112, 114, 116, 118, 120, 122, 124 by providing each block corresponding algorithms, data sets and calculation scores. The colour detection block 114 enables to determine the hair colour type. The hair texture block 116 determines a hair texture from the segmented hair region image using a hair texture trained function. The hair volume block 118 determines a hair volume from the segmented hair region image using a hair volume trained function. The hair luster block 120 determines a hair luster from the segmented hair region image using a hair luster trained function. The hair frizziness block 122 determines a hair frizziness from the segmented hair region image using a hair frizziness trained function. The hair analysis block 124 receives data from the blocks 112, 114, 116, 118, 120, 122. The analysis result block 126 outputs the hair colour name based on the corresponding HEX codes for the determined relative RGB value of the determined hair colour.

Figure 2:
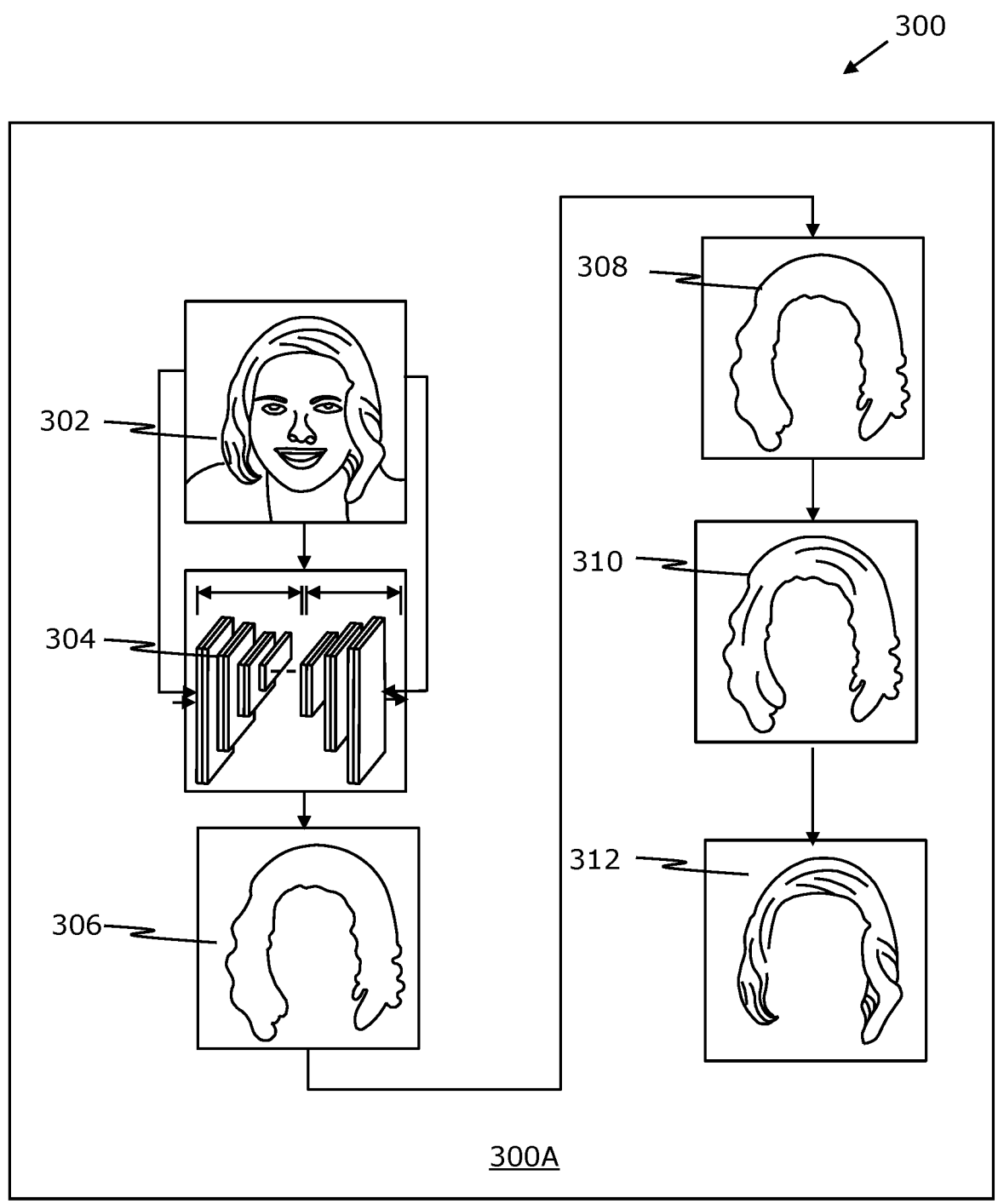
FIG. 2 is a schematic illustration of a segmentation block, of the system, for determining segmented hair region image, in accordance with an embodiment of the present disclosure.

Referring to FIG. 2, there is shown a schematic illustration of a segmentation block 300 for determining the segmented hair region image, in accordance with an embodiment of the present disclosure. The segmentation block 300 receives an image 302. The segmentation block 300 comprises a convolutional neural network (CNN) 304 which processes the image 302 to generate a segmented mask 306, which in turn is processed into a masked image 308, then a masked-out image 310 and finally a segmented hair region image 312. In particular, the image 302 is taken as an input by the segmentation block 300. The convolutional neural network (CNN) 304 processes the image 302 in order to obtain the segmented mask 306. Herein, all other features such as face and background may be masked. However, some portions of skin may be still present. The segmented mask 306 is processed further to obtain the masked image 308. The masked image 308 identifies the pixels of the hair in order to define a hair region. The masked image 308 may be processed to obtain the masked-out image 310. Herein, the hairs of the hair region may be clearer and few strands of the hairs of the hair region may be visible. The masked-out image 310 is processed to finally obtain the segmented hair region image 312. The segmented hair region image 312 provides a well-defined outline of the hair region with the strands of the hair being clearly visible.

Figure 3A:
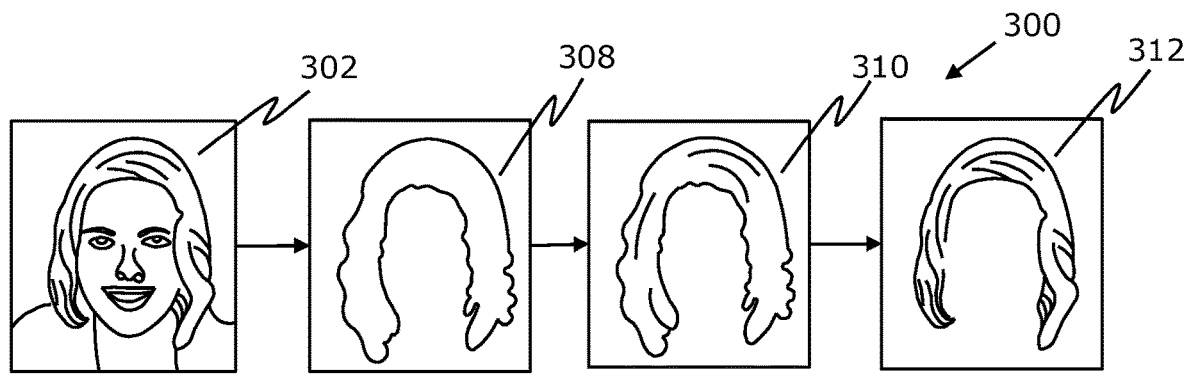
FIG. 3A is an illustration of outputs of various steps performed by the segmentation block, in accordance with an embodiment of the present disclosure.

Referring to FIG. 3A, there is shown an illustration of various intermediate outputs and the final output from the segmentation block 300, in accordance with an embodiment of the present disclosure. Herein, first the input is taken as the image 302 which is the original image of the user. The image 302 is processed to obtain the masked image 308 and the masked image 308 is processed to obtain the masked-out image 310. Finally, the masked-out image 310 is further processed to obtain the segmented hair region image 312.

Figure 3B:
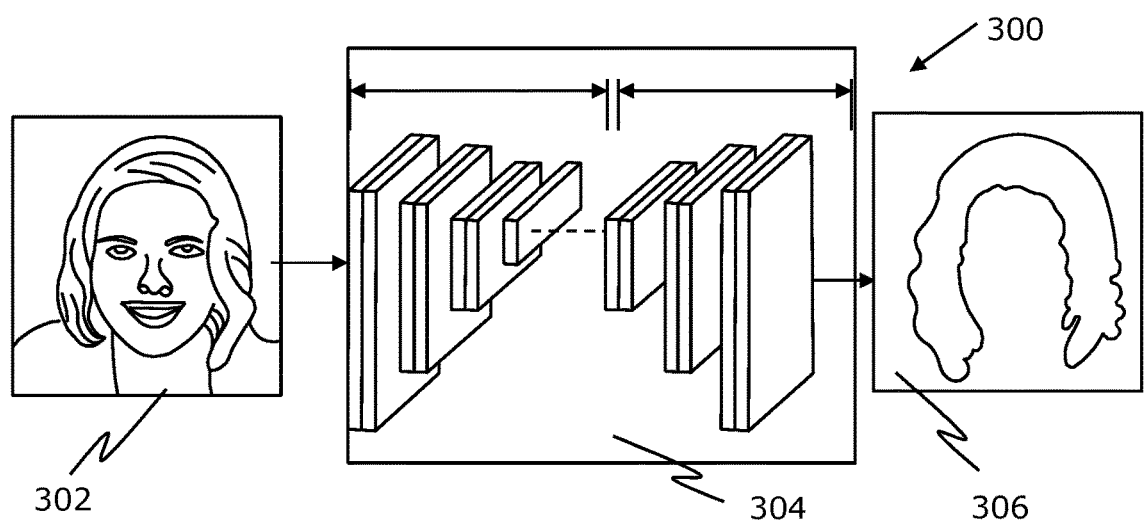
FIG. 3B is a simplified schematic illustration of the segmentation block for determining the segmented hair region image, in accordance with an embodiment of the present disclosure.

Referring to FIG. 3B, there is shown a simplified schematic illustration of the segmentation block 300 for determining the segmented hair region image, in accordance with an embodiment of the present disclosure. Herein, an image (such as, the image 302) is given as the input to a CNN (such as, the CNN 304) in order to obtain a segmented hair region image (such as, the segmented hair region image 312).

Figure 4A:
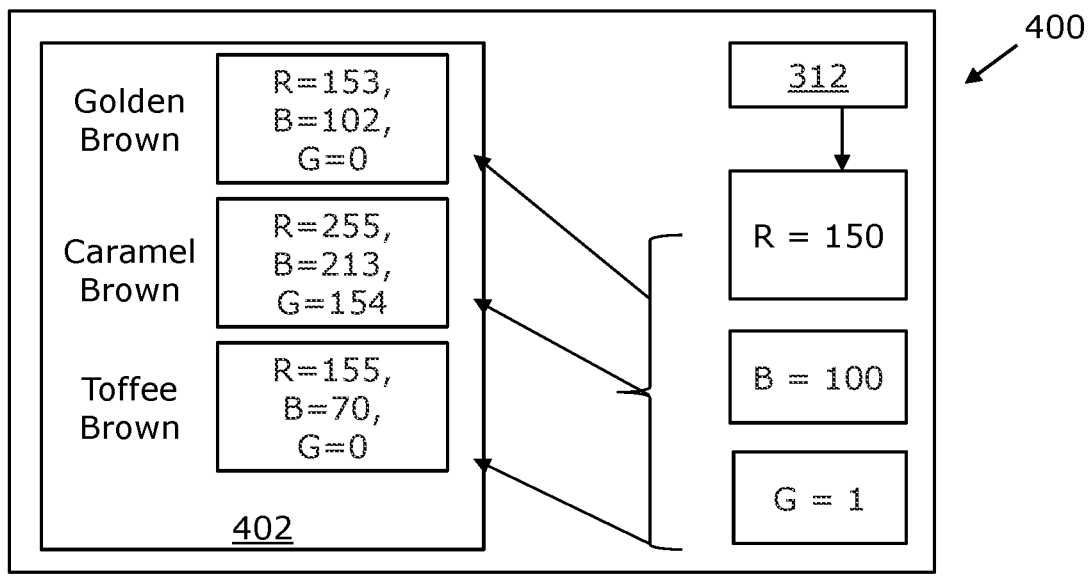
FIG. 4A is a schematic illustration of a colour detection block, of the system, for determining a hair colour name, in accordance with an embodiment of the present disclosure.

Referring to FIG. 4A, there is shown a schematic illustration of a colour detection block 400 for determining a hair colour name, in accordance with an embodiment of the present disclosure. The colour detection block 400 comprises a hair colour dictionary 402. The RGB values of pixels of a dominant hair colour types in the segmented hair region image (such as, the segmented hair region image 312) are determined. In the illustrated example, the determined RGB value is R=150, B=100 and G=1. The determined RGB value of the segmented hair region image 312 is compared with a relative RGB values of the golden brown, caramel brown and toffee brown in order to determine absolute differences in each of the R, G, and B channels. The absolute difference in each of the R, G, and B channels for the golden brown is 3, 2 and 1 respectively. The absolute difference in each of the R, G, and B channels for the caramel brown is 150, 113 and 153 respectively. The absolute difference in each of the R, G, and B channels for the toffee brown is caramel brown is 150, 30, 1 respectively. It may be observed that the absolute difference for the golden brown is minimum. Hence, the hair colour name is obtained as the caramel brown.

Figure 4B:
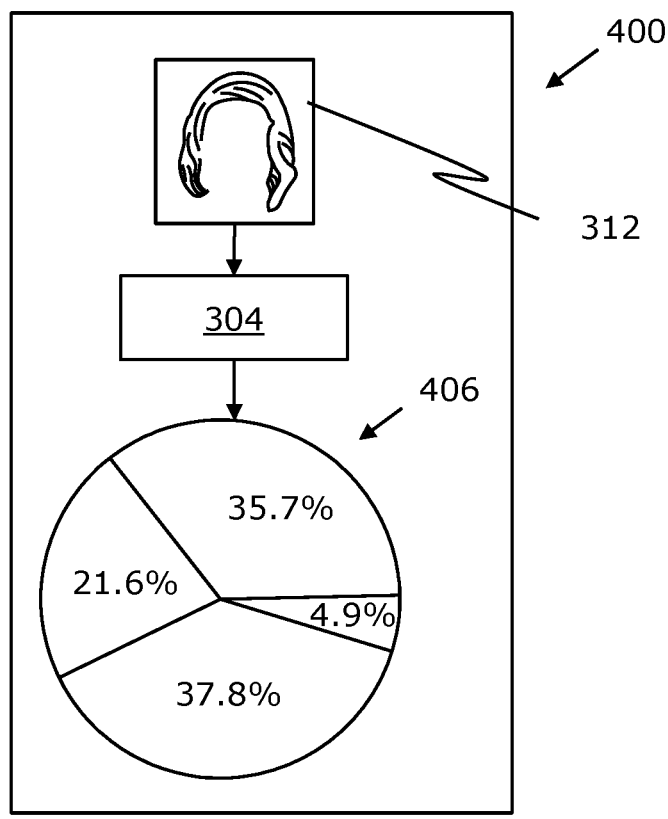
FIG. 4B is a schematic illustration of steps involved in implementation of the colour detection block, in accordance with an embodiment of the present disclosure.

Referring to FIG. 4B, there is shown a schematic illustration of steps involved in implementation of the colour detection block 400 for determining the hair colour name, in accordance with an embodiment of the present disclosure. Herein, a segmented hair region image (such as, the segmented hair region image 312) is taken as an input and is passed through a convolutional neural network (such as, the CNN 304) in order to obtain a hair colour distribution 406 with a number of clusters of colours in the segmented hair region image 312. In the illustrated example, the hair colour distribution 406 has four clusters of colours, in which the first cluster 408 is 35.7%, the second cluster 410 is 4.9%, the third cluster 412 is 37.8%, and the fourth cluster 414 is 21.6%.

Figure 5:
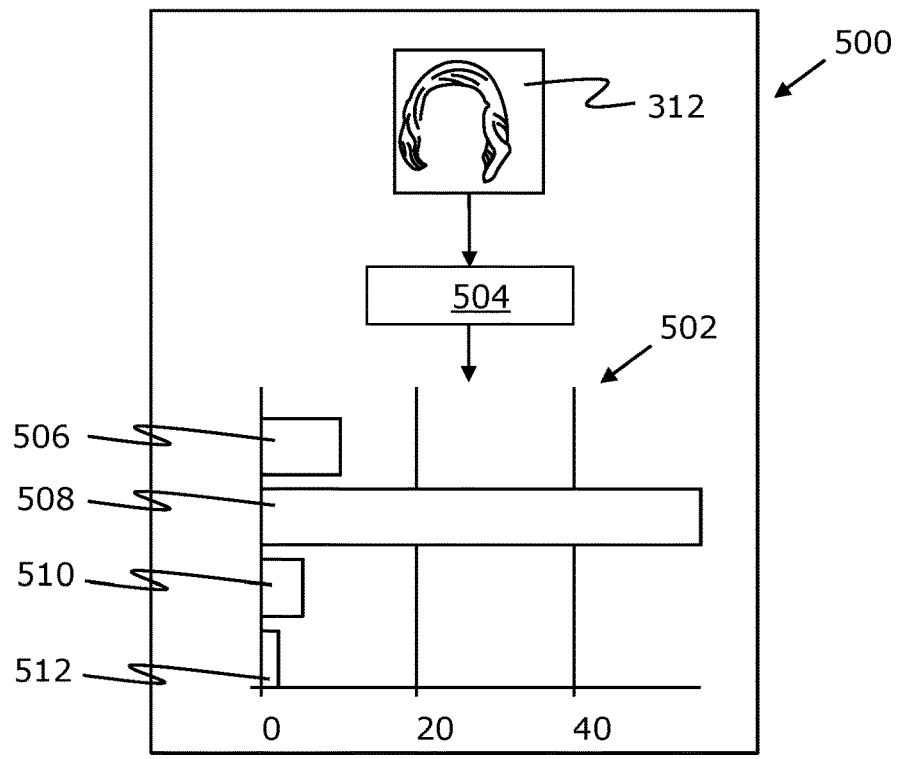
FIG. 5 is a schematic illustration of a hair texture block, of the system, for determining a hair texture, in accordance with an embodiment of the present disclosure.

Referring to FIG. 5, there is shown a schematic illustration of the hair texture block 500 for determining a hair texture, in accordance with an embodiment of the present disclosure. The hair texture block 500 comprises a hair texture trained function 504. Herein, a segmented hair region image (such as, the segmented hair region image 312) is passed through the hair texture trained function 504. The hair texture trained function 504 obtains a bar graph 502 of hair texture in terms of percentage. In the exemplary bar graph 502 of FIG. 5, the hair texture distribution after hair texture analysis is coily 506 approximately 12%, curly 508 approximately 80%, wavy 510 approximately 5% and straight 512 approximately 3%. It may be observed by the bar graph 502 that the percentage of curly is the greatest. Hence, the hair texture is determined as curly.

Figure 6:
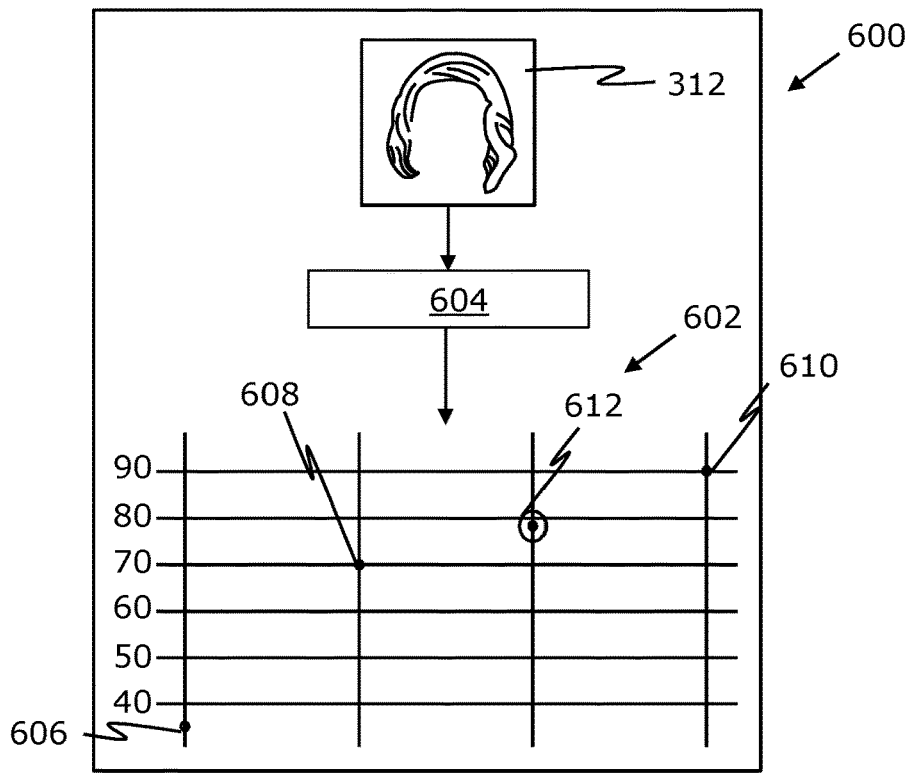
FIG. 6 is a schematic illustration of a hair volume block, of the system, for determining a hair volume, in accordance with an embodiment of the present disclosure.

Referring to FIG. 6, there is shown a schematic illustration of a hair volume block 600 for determining a hair volume, in accordance with an embodiment of the present disclosure. The hair volume block 600 comprises a hair volume trained function 604. Herein, a segmented hair region image (such as, the segmented hair region image 312) is passed through the hair volume trained function 604. The hair volume trained function 604 obtains a graph 602 of hair volume in terms of percentage. In the exemplary graph 602, the hair volume is divided into four categories: low, average and high. A threshold percentage of low is 20 which is shown by the co-ordinate 606. The threshold percentage of average is 70 which is shown by the co-ordinate 608. The threshold percentage of high is 90 which is shown by the co-ordinate 610. The percentage of the hair volume of the user is determined by the co-ordinate 612 and is 80 which is higher than the threshold percentage of the average. Hence, the hair volume of the user is determined as average.

Figure 7:
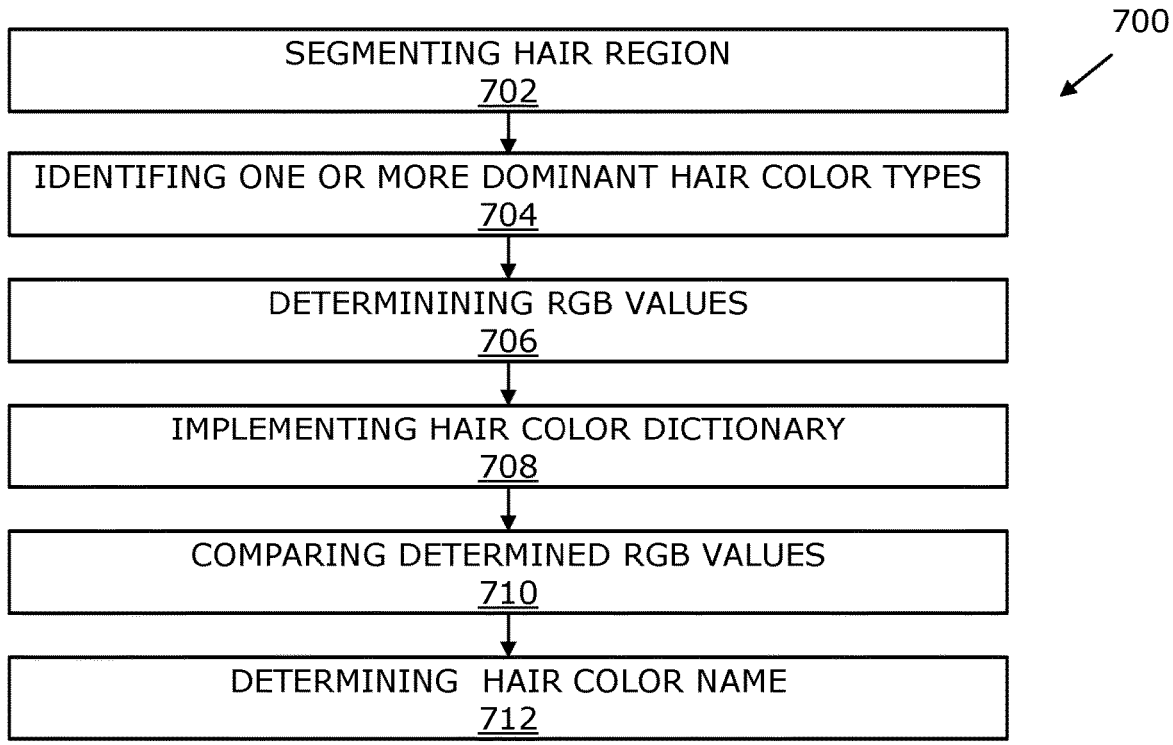
FIG. 7 is a flowchart listing steps of a method for hair analysis of the user, in accordance with an embodiment of the present disclosure.

Referring to FIG. 7, there is shown a flowchart 700 listing steps involved in a method for hair analysis of the user, in accordance with an embodiment of the present disclosure. The method comprises, at step 702, segmenting a hair region. Herein, the hair region in the image of the user is segmented to obtain the segmented hair region image. The method comprises, at step 704, identifying one or more dominant hair colour types. Herein, the one or more dominant hair colour types in the segmented hair region image is identified. The method comprises, at step 706, determining RGB values. Herein, the RGB values of pixels of the one or more dominant hair colour types in the segmented hair region image is determined. The method comprises, at step 708, implementing a hair colour dictionary. Herein, the hair colour dictionary with multiple tints of plurality of hair colours classified as different hair colour names based on corresponding HEX codes with each of the classified different hair colour names having a relative RGB value based on the corresponding HEX codes is implemented. The method comprises, at step 710, comparing the determined RGB values. Herein, the determined RGB values of the pixels of the one or more dominant hair colour types in the segmented hair region image and the relative RGB values for the classified different hair colour to identify the relative RGB value with the minimum distance from the RGB values of the pixels of the one or more dominant hair colour types based on the comparison is determined. The method comprises, at step 712, determining the hair colour. Herein, the hair colour corresponding to the identified relative RGB value with a minimum distance from the different hair colour names in the hair colour dictionary is determined.

Figure 8:
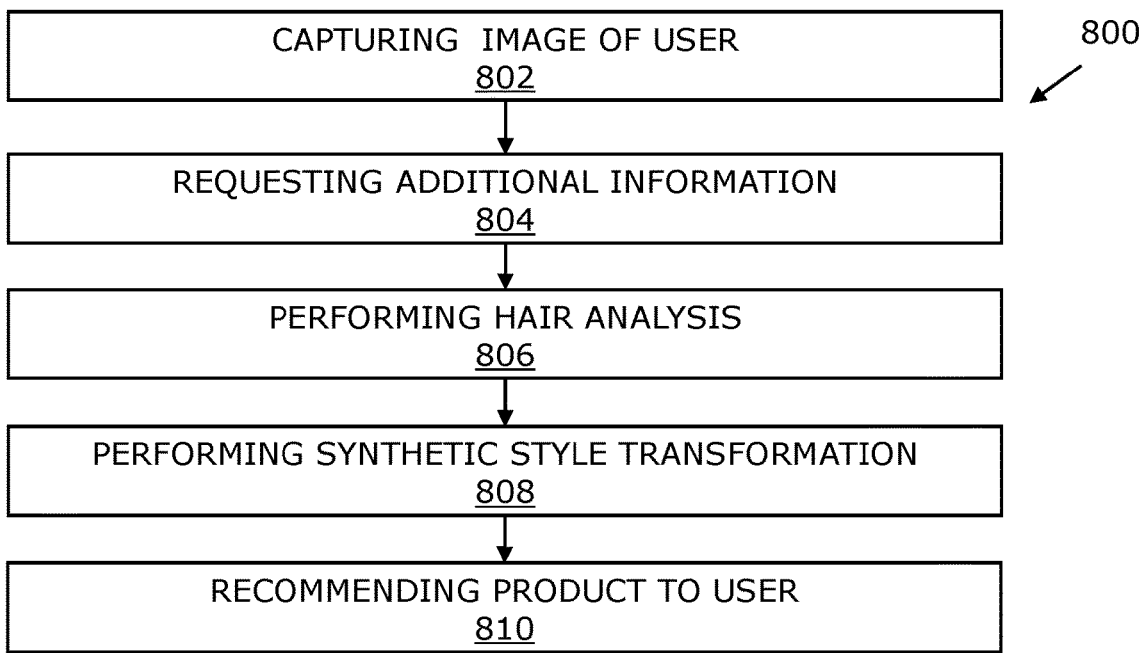
FIG. 8 is a flowchart listing steps of a method for providing one or more first recommendations to the user, in accordance with an embodiment of the present disclosure.

Referring to FIG. 8, there is shown a flowchart 800 listing steps involved in a method for providing one or more first recommendations to the user, in accordance with an embodiment of the present disclosure. The method comprises, at step 802, capturing the image of the user. The method comprises, at step 804, requesting additional information from the user. The method comprises, at step 806, performing hair analysis of the user. The method comprises, at step 808, performing synthetic style transformation in order to generate one or more style transformation images. The method comprises, at step 812, recommending a product to the user.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for hair analysis of a user, the method comprising:
   segmenting a hair region in an image of the user to obtain a segmented hair region image;
   identifying one or more dominant hair colour types in the segmented hair region image;
   determining RGB values of pixels of the one or more dominant hair colour types in the segmented hair region image;
   implementing a hair colour dictionary with multiple tints of plurality of hair colours classified as different hair colour names based on corresponding HEX codes, with each of the classified different hair colour names having a relative RGB value based on the corresponding HEX codes;
   comparing the determined RGB values of the pixels of the one or more dominant hair colour types in the segmented hair region image and the relative RGB values for the classified different hair colour types to identify the relative RGB value with a minimum distance from the RGB values of the pixels of the one or more dominant hair colour types; and
   determining the hair colour name, from the different hair colour names in the hair colour dictionary, corresponding to the identified relative RGB value with the minimum distance.

2. The method according to claim 1, wherein segmenting the hair region in the image comprises:
   identifying postures in the image;
   masking the hair region in the image based on the identified postures;
   down-sampling the image with the masked hair region;
   extracting a plurality of hair region pixel from the down-sampled image; and
   defining pixel locations of at least one of the extracted pluralities of hair region pixel.

3. The method according to claim 1, wherein identifying the one or more dominant hair colour types comprises:
   determining a hair colour distribution with a number of clusters of colours in the segmented hair region image using the clustering technique;
   selecting a predefined number of clusters of colours from the determined number of clusters of colours in the hair colour distribution;
   determining a set of centroids for the selected predefined number of clusters;

determining a pixel population count for the set of centroids, using a histogram; and determining the dominant hair colour types based on the determined pixel population count.

4. The method according to claim 3, wherein determining the pixel population count further comprises discarding the pixel population count corresponding to white colour while determining the dominant hair colour types.

5. The method according to claim 1, wherein determining the relative RGB value with the minimum distance further comprises:

determining absolute differences in each of the R, G and B channels between the determined RGB values of the pixels of the one or more dominant hair colour types in the segmented hair region image and the relative RGB values for the classified different hair colour types; and normalizing the determined absolute differences in each of the R, G and B channels.

6. The method according to claim 1, wherein the method further comprises determining a hair texture from the segmented hair region image using a hair texture trained function.

7. The method according to claim 6, wherein the method further comprises:

receiving a user selection from the user; and providing one or more first recommendations to the user based on the user selection and at least one of the hair colours, the hair texture, the hair volume, the hair luster and the hair frizziness.

8. The method according to claim 7, wherein providing the one or more first recommendations comprise recommending at least one of a new hair colour, a new hair style, a hair colour product and a hair care product.

9. The method according to claim 7, wherein the method further comprises generating one or more style transformation images by performing a synthetic style transformation based on at least one of the hair colours, the hair texture, the hair volume, the hair luster and the hair frizziness.

10. The method according to claim 7, wherein the method further comprises providing one or more second recommendations to the user based on the one or more first recommendations and the one or more style transformation images.

11. The method according to claim 1, wherein the method further comprises determining a hair volume from the segmented hair region image using a hair volume trained function.

12. The method according to claim 1, wherein the method further comprises determining a hair luster from the segmented hair region image using a hair luster trained function.

13. The method according to claim 1, wherein the method further comprises determining a hair frizziness from the segmented hair region image using a hair frizziness trained function.

14. A system for hair analysis of a user, the system comprising a segmentation block configured to segment a hair region in an image of the user to obtain a segmented hair region image; and a colour detection block configured to:

identify one or more dominant hair colour types in the segmented hair region image;

determine RGB values of pixels of the one or more dominant hair colour types in the segmented hair region image;

implement a hair colour dictionary with multiple tints of plurality of hair colours classified as different hair colour names based on corresponding HEX codes, with each of the classified different hair colour names having a relative RGB value based on the corresponding HEX codes;

compare the determined RGB values of the pixels of the one or more dominant hair colour types in the segmented hair region image and the relative RGB values for the classified different hair colour types to identify the relative RGB value with a minimum distance from the RGB values of the pixels of the one or more dominant hair colour types; and determine the hair colour name, from the different hair colour names in the hair colour dictionary, corresponding to the identified relative RGB value with the minimum distance.

15. The system according to claim 14, wherein the segmentation block is further configured to:

identify postures in the image;

mask the hair region in the image based on the identified postures;

down-sample the image with the masked hair region;

extract a plurality of hair region pixel from the down-sampled image; and define pixel locations of at least one of the extracted pluralities of hair region pixel.

16. The system according to claim 14, wherein the colour detection block is further configured to:

determine a hair colour distribution with a number of clusters of colours in the segmented hair region image using the clustering technique;

select a predefined number of clusters of colours from the determined number of clusters of colours in the hair colour distribution;

determine a set of centroids for the selected predefined number of clusters;

determine a pixel population count for the set of centroids, using a histogram; and determine the dominant hair colour types based on the determined pixel population count.

17. The system according to claim 16, wherein the colour detection block is further configured to discard the pixel population count corresponding to white colour while determining the dominant hair colour types.

18. The system according to claim 14, wherein the colour detection block is further configured to:

determine absolute differences in each of the R, G and B channels between the determined RGB values of the pixels of the one or more dominant hair colour types in the segmented hair region image and the relative RGB values for the classified different hair colour types; and normalize the determined absolute differences in each of the R, G and B channels to determine the relative RGB value with the minimum distance.

19. The system according to claim 14 further comprising:

a hair texture block configured to determine a hair texture from the segmented hair region image using a hair texture trained function;

a hair volume block configured to determine a hair volume from the segmented hair region image using a hair volume trained function;

a hair luster block configured to determine a hair luster from the segmented hair region image using a hair luster trained function; and a hair frizziness block configured to determine a hair frizziness from the segmented hair region image using a hair frizziness trained function.

20. The system according to claim 19 further comprising an analysis block configured to:

receive a user selection from the user; and provide one or more first recommendations to the user based on the user selection and at least one of the hair colours, the hair texture, the hair volume, the hair luster and the hair frizziness, wherein the one or more first recommendations comprise recommending at least one of a new hair colour, a new hair style, a hair colour product and a hair care product;

generate one or more style transformation images by performing a synthetic style transformation based on at least one of the hair colours, the hair texture, the hair volume, the hair luster and the hair frizziness; and provide one or more second recommendations to the user based on the one or more first recommendations and the one or more style transformation images.

\* \* \* \* \*